United States Patent
Schaefer

(10) Patent No.: US 9,427,936 B2
(45) Date of Patent: Aug. 30, 2016

(54) ARTICLE CUT TO SIZE

(75) Inventor: Philipp Schaefer, Hannover (DE)

(73) Assignee: LANXESS Deutschland GmbH, Cologne (DE)

( * ) Notice: Subject to any disclaimer, the term of this patent is extended or adjusted under 35 U.S.C. 154(b) by 268 days.

(21) Appl. No.: 13/813,790

(22) PCT Filed: Jul. 26, 2011

(86) PCT No.: PCT/EP2011/003725
§ 371 (c)(1),
(2), (4) Date: Feb. 1, 2013

(87) PCT Pub. No.: WO2012/016653
PCT Pub. Date: Feb. 9, 2012

(65) Prior Publication Data
US 2013/0129960 A1 May 23, 2013

(30) Foreign Application Priority Data

Aug. 4, 2010 (DE) .................... 20 2010 011 015 U

(51) Int. Cl.
*B32B 5/24* (2006.01)
*B32B 5/28* (2006.01)
(Continued)

(52) U.S. Cl.
CPC ................. *B32B 5/245* (2013.01); *B32B 5/18* (2013.01); *B32B 5/28* (2013.01); *B32B 7/02* (2013.01);
(Continued)

(58) Field of Classification Search
CPC ...... A41D 31/0016; A41D 31/0027; A41D 31/005; A41D 31/02; D06N 3/0043; D06N 3/14; D06N 3/145; D06N 3/18; D06N 3/183; D06N 3/186; D06N 3/10; D06N 3/0097; B32B 5/245; B32B 5/18; B32B 7/02; B32B 7/12; B32B 25/16; B32B 25/10; Y10T 428/15; Y10T 428/24438; Y10T 428/24901; Y10T 428/24802; Y10T 428/24975; Y10T 428/24421; Y10T 428/24372

USPC .............. 428/143, 151, 195.1, 207, 212–220
See application file for complete search history.

(56) References Cited

U.S. PATENT DOCUMENTS 4,252,910 A * 2/1981 Schaefer ................. 521/145
4,983,245 A 1/1991 Schaefer
(Continued)

FOREIGN PATENT DOCUMENTS

| AT | 007989 U1 | 12/2005 |
| DE | 3901819 A1 | 7/1990 |

(Continued)

OTHER PUBLICATIONS

European Search Report from co-pending Application PCT/EP2011/003725 dated Jan. 27, 2012, 3 pages.

*Primary Examiner* — Nancy Johnson

(57) ABSTRACT

The invention relates to a multilayered cut-to-size format comprising a thin, polyurethane-based coating (2) bonded via a polyurethane adhesive layer (3) to a textile backing (4). The invention provides that the backing (4) is a textile backing layer formed using a loop-formingly knitted fabric, a woven fabric or a fibrous non-woven web and having a thickness between 0.25 and 1.2 mm; there are capillaries in the coating (2); the solidified polyurethane dispersion (3) has a basis weight between 65 and 155 g/m² and reaches by between 0.02 and 0.55 mm into the backing (4) non-filmingly; the coating (2) has a thickness of 0.09 to 0.21 mm and a hardness between 25 and 55 Shore A; and the backing (4) is bonded on its side opposite the coating (2) to a layer (5) of polychloroprene foam which has a closed-cell structure of the foam rubber type and a density between 0.05 and 0.42 g/cm³, preferably between 0.06 to 0.28 g/cm³.

18 Claims, 1 Drawing Sheet

(51) Int. Cl.
   *B32B 7/02*    (2006.01)
   *B32B 7/12*    (2006.01)
   *B32B 5/18*    (2006.01)
   *B32B 25/10*   (2006.01)
   *B32B 25/16*   (2006.01)
   *D06N 3/00*    (2006.01)
   *D06N 3/10*    (2006.01)
   *D06N 3/14*    (2006.01)
   *D06N 3/18*    (2006.01)

(52) U.S. Cl.
   CPC .............. *B32B 7/12* (2013.01); *B32B 25/10* (2013.01); *B32B 25/16* (2013.01); *D06N 3/0043* (2013.01); *D06N 3/0097* (2013.01); *D06N 3/10* (2013.01); *D06N 3/14* (2013.01); *D06N 3/183* (2013.01); *D06N 3/186* (2013.01); *Y10T 428/15* (2015.01); *Y10T 428/24372* (2015.01); *Y10T 428/24421* (2015.01); *Y10T 428/24438* (2015.01); *Y10T 428/24802* (2015.01); *Y10T 428/24901* (2015.01); *Y10T 428/24975* (2015.01)

(56) References Cited

U.S. PATENT DOCUMENTS

| | | | |
|---|---|---|---|
| 6,746,774 B1* | 6/2004 | Schaefer | 428/423.4 |
| 2003/0186044 A1* | 10/2003 | Sauniere et al. | 428/315.7 |
| 2004/0209093 A1* | 10/2004 | Keuchel et al. | 428/474.4 |
| 2010/0263235 A1* | 10/2010 | Schaefer | 36/109 |
| 2010/0330333 A1* | 12/2010 | Jokisch et al. | 428/141 |
| 2010/0330356 A1* | 12/2010 | Jokisch et al. | 428/316.6 |
| 2013/0089718 A1 | 4/2013 | Schaefer et al. | |

FOREIGN PATENT DOCUMENTS

| | | |
|---|---|---|
| DE | 20103751 U1 | 6/2001 |
| WO | WO 2009049728 A2 * | 4/2009 |
| WO | WO 2009106498 A1 * | 9/2009 |
| WO | WO 2009106503 A1 * | 9/2009 |

* cited by examiner

ARTICLE CUT TO SIZE

The invention relates to a multilayered cut-to-size format as classified in the preamble of claim 1.

Cut-to-size formats of this type are currently being produced as plate-shaped bodies and cannot be produced in the form of reels like artificial leather for example. The invention has for its object to provide a multilayered cut-to-size format which can be used like multilayered artificial leather, but additionally offers a number of advantages and reduces or forecloses disadvantages of artificial leather.

Artificial leather is expected to have a thickness of more than 1.2 mm. Artificial leather in the form of foamed PVC has the disadvantage that its density is still more than 0.9 g/cm$^3$ despite its foamed midlayer; that it contains plasticizers which tend to emigrate; that it rigidifies at low temperatures and softens at elevated temperatures; and that it has poor thermal abrasion properties due to its pronounced thermoplastic properties. One advantage of cut-to-size formats in artificial leather is that they are inexpensive to produce as sheeting.

Polyurethane-based artificial leather more than 1.2 mm in thickness has a foam midlayer which is either coagulated or produced using a blowing agent. They are lighter than PVC-based artificial leather for the same thickness, and are also not especially thermoplastic. However, costs are considerable when premium hydrolysis-resistant polyurethanes are used. PVC-based artificial leathers also tend to rigidify at temperatures below −10° C. The environmentally friendly manufacture as sheeting requires high capital costs. As for the rest, PVC-based artificial leather and polyurethane-based artificial leather are limited in terms of their surface-design possibilities.

The problem addressed by the invention is that of devising a multilayered material that is more than 1.2 mm in thickness, does not have these disadvantages and admits of rapid and inexpensive surface styling in any desired manner using a silicone rubber support/die. Dies of this type are known in relation to the production of leathers and textile backing materials, for example from U.S. Pat. No. 4,983,245 and AT utility model 7989. The desired surface pattern is formed on a silicone base by means of a laser or by molding. The surface layer, especially polyurethane layer, for the cut-to-size format is then applied to this base and bonded to a backing.

A cut-to-size format according to the invention shall be significantly lighter in terms of material and change its flexural stiffness only insignificantly, if at all, over a wide temperature range. It shall in addition have a highly pronounced abrasion-resistant, low-flammability, thermally insulating, shock- and impact-absorbing and soundproofing effect. The cut-to-size format shall also be waterproof for certain applications. The surface of the cut-to-size format shall further be comprehensively stylable; more particularly, the surface shall be able to exhibit in its fine structure the appearance of carbon or glass fiber fabric.

These objectives are achieved according to the invention for a cut-to-size format of the type referred to at the beginning when the backing is a textile backing layer formed using a loop-formingly knitted fabric, a woven fabric or a fibrous nonwoven web and has a thickness between 0.25 and 1.2 mm, there are capillaries in the coating, the solidified polyurethane adhesive dispersion has a basis weight between 65 and 155 g/m$^2$ and reaches by between 0.02 and 0.55 mm into the backing non-filmingly, the coating has a thickness of 0.09 to 0.21 mm, the backing is bonded on its side opposite the coating to a layer of polychloroprene foam which has a closed-cell structure of the foam rubber type and a density between 0.05 and 0.42 g/cm$^3$, preferably between 0.06 to 0.28 g/cm$^3$, the coating has a hardness between 25 and 55 Shore A, and the cut-to-size format has a density between 0.20 and 0.65 g/cm$^3$ depending on the thickness of the layer.

Contributions to this are especially made by the construction of the cut-to-size format and its individual layers and the cooperation between the individual different layers and materials used, or the capillaries formed.

The thin, soft and non-thermoplastic coating ensures extremely good abrasion properties, especially as a result of a portion of the crosslinked adhesive layer being inseparably bonded to the coating, or forming part of the latter, and the other portion sheathing the textile fibers of the backing which are used. It is thus the case that no layer resembling a supported or unsupported film is formed in the region of the textile fibers; instead, the textile fibers merely become non-filmingly sheathed with the adhesive layer as a whole or in part. A firm bond is formed as a result between the coating and the backing without any rigidification of material, since the textile fibers have not become completely embedded in a film. The polychloroprene rubber has a microfine, closed-cell structure of foam rubber type. The polychloroprene foam does not contain volatile plasticizers, is cold and heat resistant, incombustible, very light and leads to excellent insulation properties. This is more particularly the result of the textile backing being between the thin coating and the bulk of the polychloroprene foam. Conventional cut-to-size blanks have the foam between a compact top layer and the textile backing on the bottom side.

In the case of the cut-to-size format according to the invention, a polyurethane dispersion is sprayed onto the negatively surface-patterned silicone rubber support. As a result, fine capillaries form at the surface of a coating, which are scarcely visible, if at all, to the naked eye. A sprayed application of a polyurethane adhesive dispersion to the reverse side of the coating is used to largely reseal the capillaries to prevent ingress of water. A further portion of PU adhesive dispersion is applied to the carrier by spraying or using a roll such that the PU adhesive dispersion only attaches to the fibers of the backing and leaves the interstices in the loop-formingly knitted or woven or fibrous nonwoven web fabric forming the backing largely clear. After the heat-activatable adhesive dispersion on the coating reverse side and the PU adhesive dispersion applied to the textile backing have dried, the two sides are placed together and bonded together into one ply using heat and pressure.

The invention will now be for example more particularly elucidated with reference to the drawing.

Figure 1:
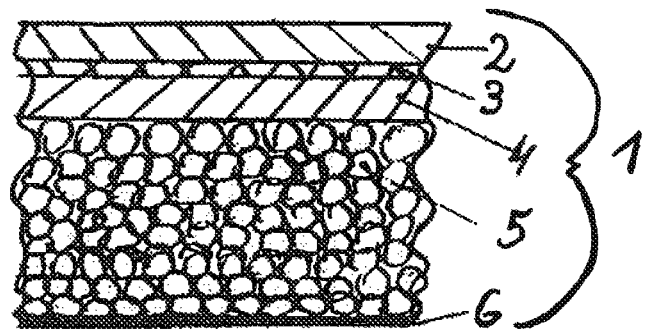
FIG. 1 shows a section through a cut-to-size format which is in accordance with the present invention.

FIG. 1 depicts a section through a multilayered cut-to-size format. This cut-to-size format 1 has a thin, 0.09 to 0.21 mm thick surface coating 2 produced using a polyurethane dispersion formed as a negative copy of a surface-patterned silicone rubber support. This support preferably is a negative of the surface of a carbon or glass fiber fabric. This negative is produced by lift-off molding with silicone rubber and shows the negative representation of such a fabric, especially with its particular finely fibrous structure. This coating 2 is bonded by a polyurethane adhesive dispersion 3 to a textile backing 4. This polyurethane adhesive dispersion 3 has a basis weight between 65 and 155 g/m$^2$. This polyurethane adhesive dispersion reaches by between 0.02 and 0.55 mm into the backing 4 in a non-filming manner. The backing 4 is bonded on its side opposite the coating 2 to a layer 5 of polychloroprene foam. This foam has a closed-cell structure of the foam rubber type and a density between 0.05 and 0.42 g/cm$^3$, preferably between 0.06 to 0.28 g/cm$^3$.

Figure 2:
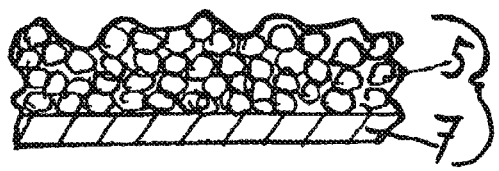
FIG. 2 shows a detail of one version.

The underside of this layer 5 of polychloroprene foam may have a thin homogeneous skin 6 of the same material bound to it in a thickness between 0.01 and 0.06 mm. Instead of this skin 6 it is also possible for a textile layer 7 to be attached, as depicted in FIG. 2. This textile layer 7 has a thickness between 0.15 and 0.95 mm.

It is advantageous when the coating 2 contains between 55 and 95 wt % and preferably between 68 and 87 wt % of a solidified, crosslinked polyurethane dispersion and optionally has a density between 0.9 and 1.12 g/cm$^3$. This ensures the desired strength and abrasion resistance and also bendability for the cut-to-size format.

When the backing 4 is a textile backing layer it comprises and natural fibers with or without elastomeric fibers. This can be used to influence the thickness and extensibility of backing layer 4 and also of the cut-to-size format.

To obtain a good, soft and flexible bond between the polyurethane adhesive layer 3 and the backing 4, it is provided that the polyurethane adhesive layer 3, optionally formed using a crosslinked polyurethane dispersion, reaches by between 0.02 and 0.55 mm into the backing 4 and is not filmingly bound or attached to the textile fibers, instead merely sheathing them wholly or partly.

To endow the layer 5 of polychloroprene foam with enhanced thickness and bendability, it can be provided that the layer 5 of polychloroprene foam has a thickness between 1.0 and 4.5 mm and is bound to the backing 4 with an adhesive containing polychloroprene and/or polyurethane or directly in the course of its production.

It may further be provided that coating 2 contains pigment particles and silicone particles.

The scope for styling the cut-to-size format of the present invention is large and varied. It may be provided that the surface of coating 2 displays the appearance of grained or nubuck leather or the appearance of textiles or a technical appearance, preferably of sandpaper or of a waffle pattern, or the appearance of patterns lasered directly or indirectly into a silicone rubber support, and/or of logos. It may also be provided that at least two of the different layers 2, 3, 4, 5, 6 have different colors. It is also possible for the surface of the cut-to-size format to be differentially patterned and optionally to include a region having a nubuck leather type and a carbon-fabric type appearance. It is also possible to endow the surface in its fine structure with the appearance of carbon or glass fiber fabric.

The cut-to-size format of the present invention also offers advantages in view of its permeability regarding water and water vapor. It may be provided that there are microperforations in the cut-to-size format such that the cut-to-size format is permeable to water vapor and/or air yet waterproof. The layers produced using polyurethane and/or using polychloroprene foam are inherently impervious to water, impervious to water vapor and impermeable to air. Microaperturing can be used to ensure that the layers are water vapor and/or air permeable, but remain waterproof.

Figure 3:
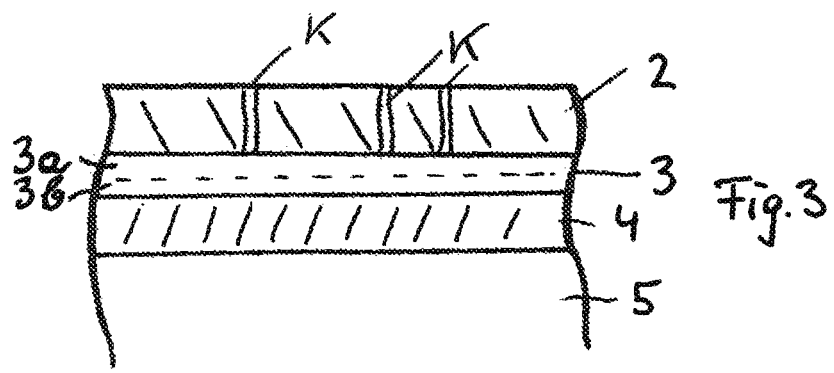
FIG. 3 shows a section through a preferred embodiment.

A particularly advantageous embodiment of the multilayered cut-to-size format of the present invention is obtained when, in accordance with FIG. 3, it is provided that the polyurethane adhesive layer 3 has a two-ply configuration wherein one ply 3a has been applied to the reverse side, of coating 2 and the other ply 3b has been applied to the backing, preferably using a roll or by spraying, and the two plies are bonded, together using heat and pressure. This provides a simple way to produce the cut-to-size format while preserving the bendability of the cut-to-size format and making the water-vapor permeability adjustable.

It is further provided that the more particularly visible capillaries K in the coating 2 are sealed off on the reverse side of coating 2 by the there applied ply of polyurethane adhesive layer 3. This configuration makes it possible for coating 2 to be water-vapor permeable without allowing water to penetrate into the backing layer of the cut-to-size format.

To render the coating 2 water-vapor permeable yet waterproof, it may be provided according to the present invention that the coating 2 contains silicone and/or silicone particles, optionally at from 1 to 15% and preferably from 2 to 11% of the weight of coating 2, wherein the silicone and/or the silicone particles form an emulsion and/or dispersion in coating 2. The measure that coating 2 contains silicone means that coating 2 is hydrophobic, i.e., the penetration of water into the open capillaries in the coating is prevented, while water vapor can escape.

The cut-to-size format of the present invention has flexural strength and the softness which is advantageous for its use when the polyurethane adhesive layer 3 is formed using an aqueous polyurethane dispersion which in the crosslinked state has a hardness of less than 45 Shore A and preferably less than 35 Shore A. More particularly, these advantages are enhanced when the polyurethane adhesive layer (3) has an amorphous structure.

It is advantageous for using the multilayered cut-to-size format when coating 2 is free of plasticizers.

The proportion of silicone and/or silicone particles ensures this property for coating 2.

The cut-to-size format of the present invention has visible capillaries on its surface, i.e., on the surface of coating 2. These capillaries K are largely sealed and/or reduced in their diameter by polyurethane adhesive layer 3 in the course of coating 2 being produced. The capillaries K thus have the purpose to control the water-vapor/water balance in the surface region of the cut-to-size format. This is contrary to capillaries, which pass through the entire layer applied atop backing 4.

The method of DE 30 09 976 A1 is used to bond a neoprene foam to a jersey and the jersey to a thin film of polyurethane. The neoprene foam has a jersey fabric on the reverse, while the thin polyurethane film on the surface is directly bonded to the neoprene foam. The problem addressed there is that of providing sheeting material for the production of wetsuits and/or a wetsuit. That is, the cut-to-size make-up blanks for the suit are cut out of the final material. But sheeting material is in principle produced differently than cut-to-size formats.

According to this DE-A1 document, a polyurethane film is produced from a polyurethane solution which contains organic solvents, such as dimethylformamide, methyl ethyl ketone, toluene or a mixture thereof. This polyurethane solution is blade-coated atop a smooth or finely grained release paper, since spraying is not possible. After the solvents have evaporated, the film has a thickness of 0.01-0.05 mm. The thin film produced on the release paper backing is coated with a PU or chloroprene solvent adhesive. While the solvents in the adhesive evaporate, the film is advanced and covered with the stretch fabric to be applied. Thereafter, the stretch fabric and the foam, or the foam on its own, i.e., both without adhesive, are placed on the film. This is followed by drying at 30° C. in a drying machine for 48 hours to bring about complete reaction of the adhesives. It is only then that the release paper is peeled off. This environmentally burdensome and costly process is necessary because solvent removal is not possible from the release paper itself in the downward direction and from the closed-cell foam in the upward direction. Thin films of 0.01 to 0.05 mm are easier to handle, dry more quickly than thicker finishes. But the DE-A1 document does not contain any indication as to the thickness of the adhesive film which is roll-applied to the polyurethane film and thus also no indication as to its constitution in the fabric or to be more precise as to how deeply it has penetrated into the fabric and encloses the fibers.

The coating applied according to the present invention is at least between from 9 to 21 times thicker than the coating film known from the DE-A1 document and the coating is produced from a freely patterned plate of silicone. Owing to this method of making, the coating may have visible capillaries on its surface which are largely sealed by the ply of applied polyurethane adhesive layer 3, but do survive to some extent. Accordingly, the other ply of adhesive layer 3 is applied directly atop backing 4 such that the adhesive 3, as mentioned, does not form a film and penetrates into the backing 4 in a defined manner. After the two plies/add-ons of polymer have dried through water removal, the plies of heat-activable polyurethane adhesive are heat and pressure bonded together to form one layer.

It is further provided that the cut-to-size format of the present invention shall not contain any plasticizer. The familiar neoprenes do contain a high proportion of naphthene plasticizer oil as plasticizer. Wet suits, i.e., suits used in water, are not prone to any migration. In the fields of interest to the present invention, for example shoe manufacture, the interior trim of vehicles, etc, plasticizers would emigrate and cause fogging problems. The fabrication process known from the DE-A1 document finally does not permit use of the products in the vehicle industry because of the CO2 emission statutes.

Nor is it possible to produce patterning which is in accordance with the present invention, such as carbon fabric, glass fiber fabric, nubuck surfaces on a release paper and especially not on a polyurethane film produced using a polyurethane solution and having a thickness between 0.01-0.05 mm. The texture elevations and depressions are generally greater than those known from the DE-A1 film. That a coating film less than 0.05 mm in thickness does not meet the wear resistance requirements of shoes and vehicles is self-evident.

DE 39 018 19 A2 discloses a foam coated with a reactive resin. The material is hard and brittle.

DE 10 2008 000 419 A1 seeks to provide a material having an extremely high water-vapor permeability. This is achieved by forming continuous capillaries that pass through all layers. The use of chloroprene foams is not envisioned.

The fields of use for the cut-to-size format of the present invention are various. It is advantageous to use a cut-to-size format of the present invention to produce articles in the form of automotive interior trim, motorbike, bicycle or riding saddles, seats, recamieres, medical chairs or beds, contract furniture covers, perambulators, safety and sports shoes, bags or holders for notebooks, cell phones, cameras and other shock-sensitive equipment, or of protective, apparel and parts of protective apparel for disaster control and also for fishermen and women, sportsmen and women or fire-fighters.

It has transpired that the cut-to-size format offers immense advantages when used to cover airbag zones in automotive interior trim. Particularly the embodiment where there is a textile backing 7 on the reverse side a simple way is provided to create with a laser, for example, a preprogrammed area of infirmity without damaging the textile backing 4 bonded to coating 2.

It has transpired that the use of hollow microspheres in coating 2 and/or in adhesive layer 3 is advantageous. At a volume fraction between 3 to 24%, these do not just reduce the weight but also improve the haptics. The hollow microspheres may consist of plastics material, but preferably of glass, and have a size between 5 to 65 µm. Using hollow microspheres made of glass also improves the fire behavior of coating 2.

It is advantageous when the textile backing 4 and/or the textile material 7 have low flammability.

The invention lastly also relates to the use of cut-to-size formats for producing these recited articles.

What is claimed is:

1. A multilayered cut-to-size format comprising:
   a polyurethane layer having a thickness of 0.09 mm to 0.21 mm, a density city of 0.9 to 1.12 g/cm$^3$, and a hardness of 25 Shore A to 55 Shore A, wherein the polyurethane layer contains 68 to 78 wt % of a solidified, cross-linked polyurethane dispersion and has a first surface, and a second surface opposite the first surface, and the polyurethane layer comprises capillaries within the layer wherein at least a portion of the capillaries extend through the layer from the first surface to the second surface;
   a textile backing layer having a thickness of 0.25 mm to 1.2 mm and comprising textile fibers in a loop-formingly knitted fabric, a woven fabric or a fibrous nonwoven web, wherein the backing layer has a first surface disposed towards the polyurethane layer and a second surface opposite the first surface;
   a polyurethane adhesive disposed between the second surface of the polyurethane layer and the first surface of the backing layer to retain the polyurethane layer with the backing layer, the polyurethane adhesive having a basis weight of 65 g/m$^2$ to 155 g/m$^2$ and extending into the backing layer 0.02 mm to 0.55 mm wherein the polyurethane adhesive at least partly sheaths the textile fibers and is not filmingly bound or attached to the textile fibers; and
   a polychlorobrene foam layer bound with the second surface of the backing layer, the polychloroprene foam layer having a closed-cell structure of a foam rubber type and having a thickness of 1.0 mm to 4.5 mm and a density of 0.05 g/cm$^3$ to 0.42 g/cm$^3$.

2. The multilayered cut-to-size format of claim 1, wherein the polyurethane layer comprises a polyurethane dispersion patterned on a surface-patterned silicone rubber support.

3. The multilayered cut-to-size format of claim 1, wherein the polychloroprene foam layer has a first surface bound with the second surface of the backing layer and second surface opposite the first surface, and the multilayered cut-to-size format further comprises one of:
   a thin homogeneous skin of the same polychloroprene foam as the polychloroprene foam layer and having a thickness of 0.01 to 0.06 mm, or
   a textile layer having a thickness of 0.15 to 0.95 mm bound to the second side of the polychloroprene foam layer.

4. The multilayered cut-to-size format of claim 1, wherein the textile backing layer comprises synthetic and/or natural fibers with or without eiastomeric fibers.

5. The multilayered cut-to-size format of claim 1, wherein the polychloroprene foam layer is bound with the second surface of the backing layer by one of:
   direct adherence of the polychloroprene foam layer to the second surface of the backing layer by forming of the polychloroprene foam layer on the second surface of the backing layer, or
   an additional adhesive adhering the polychloroprene foam layer with the second surface of the backing layer, wherein the additional adhesive comprises at least one of polychloroprene and polyurethane.

6. The rnultilayered cut-to-size format of claim 1, wherein the polyurethane layer contains pigment particles and/or silicone particles.

7. The multilayered cut-to-size format of claim 1, wherein the first surface of the polyurethane layer is configured to have an appearance of at least one of: grained leather, nubuck leather, textiles, sandpaper, a waffle pattern, patterns lasered directly or indirectly into a silicone rubber support, logos, carbon fabric, and a depiction of fibrous fine structuring.

8. The multilayered cut-to-size format of claim 1, wherein at least one of the layers has a color different from a color of another of the layers.

9. The multilayered cut-to-size format of claim 1, wherein the first surface of the polyurethane layer comprises a differentially patterned surface and optionally includes a region configured to have a nubuck leather type appearance and a carbon-fabric type appearance.

10. The multilayered cut-to-size format of claim 1, further comprising microperforations extending through the cut-to-size format, from the first surface of the polyurethane layer, through the polyurethane layer, the adhesive, and the backing layer to the second surface of the backing layer, wherein the microperforations are configured to provide permeability for at least one of air and water vapor, and impermeability to water.

11. The multilayered cut-to-size format of claim 1, wherein the cut-to-size format has a density between 0.20 $g/cm^3$ and 0.65 $g/cm^3$ depending on the thickness of the polychloroprene foam layer.

12. The multilayered cut-to-size format of claim 1, wherein the polyurethane adhesive has a two-ply configuration wherein the second surface of the polyurethane layer has a first ply of the polyurethane adhesive applied thereon, and the first surface of the backing layer has a second ply of the polyurethane adhesive applied thereon and the two plies are bonded by heat and pressure.

13. The multilayered cut-to-size format of claim 1, wherein the polyurethane layer is free of plasticizers.

14. The multilayered cut-to-size format of claim 12, wherein the capillaries are sealed at the second side of the polyurethane layer by the first ply of the polyurethane adhesive.

15. The multilayered cut-to-size format of claim 1, wherein the polyurethane layer comprises 1% to 15% by weight of silicone and/or silicone particles, wherein the silicone and/or the silicone particles comprise an emulsion and/or dispersion in the polyurethane layer.

16. The multilayered cut-to-size format of claim 1, wherein the polyurethane adhesive comprises an aqueous polyurethane dispersion which in the cross-linked state has a hardness of less than 45 Shore A.

17. The multilayered cut-to-size format of claim 1, wherein the polyurethane adhesive has an amorphous structure.

18. The multilayered cut-to-size format of claim 1, wherein the polyurethane layer and/or the polyurethane adhesive comprise a 3% to 24% volume fraction of hollow microspheres having a size of 5 μm to 65 μm, wherein the hollow microspheres comprise at least one of plastic microspheres and glass microspheres.

* * * * *